(12) United States Patent
Gong et al.

(10) Patent No.: US 11,181,999 B2
(45) Date of Patent: Nov. 23, 2021

(54) TOUCH PANEL, TOUCH MODULE AND METHOD FOR DETECTING CRACK IN TOUCH PANEL

(71) Applicants: Chengdu BOE Optoelectronics Technology Co., Ltd., Chengdu (CN); BOE TECHNOLOGY GROUP CO., LTD., Beijing (CN)

(72) Inventors: Qing Gong, Beijing (CN); Wenxiao Niu, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/771,761

(22) PCT Filed: Dec. 20, 2019

(86) PCT No.: PCT/CN2019/127169
§ 371 (c)(1),
(2) Date: Jun. 11, 2020

(87) PCT Pub. No.: WO2020/143430
PCT Pub. Date: Jul. 16, 2020

(65) Prior Publication Data
US 2021/0247859 A1 Aug. 12, 2021

(30) Foreign Application Priority Data
Jan. 8, 2019 (CN) .......................... 201910016302.0

(51) Int. Cl.
*G06F 3/041* (2006.01)
*G09G 3/00* (2006.01)

(52) U.S. Cl.
CPC ............ *G06F 3/041* (2013.01); *G09G 3/006* (2013.01)

(58) Field of Classification Search
CPC ................................. G06F 3/041; G09G 3/006
See application file for complete search history.

(56) References Cited

U.S. PATENT DOCUMENTS

| 10,152,196 B2 | 12/2018 | Jeong et al. |
| 2017/0371455 A1 | 12/2017 | Dai et al. |
| 2020/0137890 A1* | 4/2020 | Lee ........................ H05K 1/028 |

FOREIGN PATENT DOCUMENTS

| CN | 105632382 A | 6/2016 |
| CN | 107464512 A | 12/2017 |

(Continued)

OTHER PUBLICATIONS

International Search Report and Written Opinion for International Application No. PCT/CN2019/127169 dated Mar. 19, 2020.

(Continued)

*Primary Examiner* — Charles V Hicks
(74) *Attorney, Agent, or Firm* — Thomas | Horstemeyer, LLP

(57) ABSTRACT

The present disclosure relates to the field of display technology and provides a touch sensor. The touch sensor is provided with a bonding area for bonding a circuit board, and the bonding area is provided with at least one test pin group for detecting a bonding state of the touch sensor and the circuit board. The test pin group comprises two test pins, the two test pins are short-circuited by a short-circuiting wire, and the short-circuiting wire extends beyond the bonding area.

16 Claims, 3 Drawing Sheets

(56) References Cited

FOREIGN PATENT DOCUMENTS

| | | |
|---|---|---|
| CN | 107611160 A | 1/2018 |
| CN | 206931070 U | 1/2018 |
| CN | 207337376 U | 5/2018 |
| CN | 108333499 A | 7/2018 |
| CN | 108762562 A | 11/2018 |
| CN | 208335161 U | 1/2019 |
| CN | 109739386 A | 5/2019 |
| JP | 2014021479 A | 2/2014 |
| WO | 2018223753 A1 | 12/2018 |

OTHER PUBLICATIONS

First Office Action for CN Patent Application No. 201910016302.0 dated Jan. 3, 2020.
Second Office Action for CN Patent Application No. 201910016302.0 dated Aug. 12, 2020.

* cited by examiner

TOUCH PANEL, TOUCH MODULE AND METHOD FOR DETECTING CRACK IN TOUCH PANEL

CROSS REFERENCE TO RELATED APPLICATIONS

The present application is a § 371 national phase application based upon PCT Patent Application No. PCT/CN2019/127169, filed on Dec. 20, 2019, which claims the benefit of and priority to Chinese Patent Application No. 201910016302.0, filed on Jan. 8, 2019, where the contents of which are incorporated by reference in their entireties herein.

TECHNICAL FIELD

The present disclosure relates to the field of display technology and, in particular, to a touch sensor, a touch module, and a method for detecting cracks in a touch sensor.

BACKGROUND

A touch module generally includes a touch sensor and a circuit board provided with a touch integrated circuit. The touch sensor is usually connected to the circuit board provided with the touch integrated circuit through a bonding technology.

It should be noted that the information disclosed in the above Background section is only for enhancing the understanding of the background of the present disclosure and, therefore, may include information that does not constitute prior art known to those of ordinary skill in the art.

SUMMARY

The present disclosure provides a touch sensor, a touch module, and a method for detecting cracks in a touch sensor.

According to an aspect of the present disclosure, a touch panel is provided including a touch area and a peripheral area surrounding the touch area, a bonding area being provided in the peripheral area at at least one side of the touch area, and the bonding area being used for bonding a circuit board, wherein at least one test pin group is provided in the bonding area for detecting cracks of the touch panel; each test pin group includes two test pins, the two test pins are short-circuited by a short-circuiting wire; and the short-circuiting wire is extended beyond the bonding area.

In an exemplary embodiment of the present disclosure, the touch panel has a slotted area, the bonding area is located in the slotted area, the slotted area includes a special-shaped slotted area at a region of the slotted area other than the bonding area, and the short-circuiting wire is configured to pass through the special-shaped slotted area and is extended to the peripheral area outside the slotted area.

In an exemplary embodiment of the present disclosure, the short-circuiting wire surrounds the touch area.

In an exemplary embodiment of the present disclosure, the test pin group includes a first test pin group and a second test pin group. The first test pin group is provided on a first side of the bonding area and includes two first test pins, and the two first test pins are short-circuited through a first short-circuiting wire; and the second test pin group is provided on a second side of the bonding area opposite to the first side, the second test pin group includes two second test pins, and the two second test pins are short-circuited through a second short-circuiting wire.

In an exemplary embodiment of the present disclosure, the first short-circuiting wire is extended to the special-shaped slotted area and extending along an edge trace of the special-shaped slotted area, and the first short-circuiting wire is extended to the peripheral area of the touch panel along a direction of the first side of the bonding area.

In an exemplary embodiment of the present disclosure, the second short-circuiting wire is extended to the special-shaped slotted area and extending along the edge trace of the special-shaped slotted area, and the second short-circuiting wire is extended to the peripheral area of the touch panel along a direction of the second side of the bonding area opposite to the first side.

In an exemplary embodiment of the present disclosure, the first short-circuiting wire and the second short-circuiting wire are extended all over the peripheral area.

In an exemplary embodiment of the present disclosure, the first short-circuiting wire and the second short-circuiting wire meet at a corner of the peripheral area but do not contact with one another.

In an exemplary embodiment of the present disclosure, a length of the first short-circuiting wire extending in the peripheral area is different from a length of the second short-circuiting wire extending in the peripheral area.

In an exemplary embodiment of the present disclosure, the substrate is a polarizer.

According to an aspect of the present disclosure, there is provided a touch module including the above-mentioned touch panel and a circuit board provided with a touch integrated circuit, the circuit board being bound to the touch panel; at least one test pin group is provided in a bonding area of the circuit board, and the test pin group includes two test pins; when the circuit board is bound to the touch panel, the two test pins of the touch panel are directly opposite to two test pins of the circuit board, respectively.

According to an aspect of the present disclosure, a method for detecting cracks in a touch panel, the method is provided for detecting the above-mentioned touch module. The method includes:

collecting, by an electrical signal collection unit, an electrical signal between two test pins on the circuit board;

determining whether the touch panel has a crack, according to the electrical signal.

According to an aspect of the present disclosure, the method further includes collecting an electrical signal between a plurality of test pin groups with different short-circuiting wire extension lengths through the electrical signal collection unit and determining whether the touch panel has the crack and a location of the crack according to the electrical signal.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Understandably, the drawings in the following description are only some embodiments of the present disclosure. For those of ordinary skill in the art, without paying any creative work, other drawings may be obtained based on these drawings.

DETAILED DESCRIPTION

Figure 1:
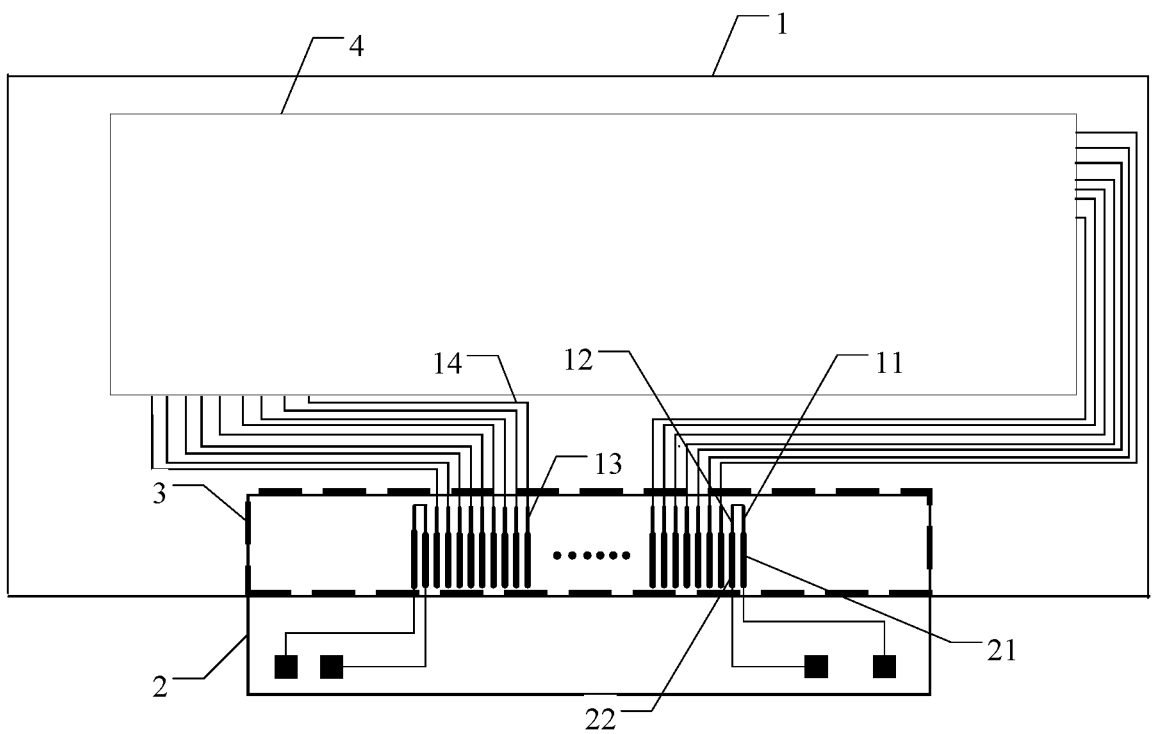
FIG. 1 is a schematic structural diagram of a touch module in a comparison embodiment.

Example embodiments will now be described more fully with reference to the drawings. However, the example embodiments may be implemented in various forms and should not be construed as being limited to the examples set forth herein. On the contrary, providing these embodiments makes the present disclosure more comprehensive and complete, and fully conveys the idea of the example embodiments for those skilled in the art. The same reference numerals in the drawings denote the same or similar structures, and thus their detailed description will be omitted.

Although relative terms are used in this specification, such as "upper" and "lower" to describe the relative relationship between one component of an icon and another component, these terms are used in this specification only for convenience, for example according to the directions of the examples described in the drawings. It may be understood that if the described device is turned upside down, the component described as "upper" will become the component under "lower". Other relative terms, such as "high", "low", "top", "bottom", "left", "right", etc., have similar meanings. When a structure is "on" another structure, it may mean that the structure is integrally formed on the other structure, or that the structure is "directly" arranged on the other structure, or that the structure is "indirectly" arranged on the other structure through another structure.

The terms "a", "an", "said" are used to indicate the presence of one or more elements/components/etc.; the terms "include" and "have" are used to mean an open-ended inclusion and mean that there may be other elements/components/etc. in addition to the listed elements/components/etc.

As shown in FIG. 1, a schematic structural diagram of a touch module in a comparison embodiment is shown. The touch module includes a touch sensor 1 and a circuit board 2. The touch sensor 1 is provided with a test pin group including a test pin 11 and a test pin 12, wherein the test pin 11 and the test pin 12 are short-circuited; the circuit board 2 is provided with a test pin group including a test pin 21 and a test pin 22. When the touch sensor 1 is bound to the circuit board 2, the test pin 11 and the test pin 21 are directly opposite, and the test pin 12 and the test pin 22 are directly opposite. By detecting an electrical signal between the test pin 21 and the test pin 22, a bonding state between the touch sensor 1 and the circuit board 2 may be determined. For example, if a resistance between the test pin 21 and the test pin 22 is small, the bonding state is good, and if the resistance between the test pin 21 and the test pin 22 is large, the bonding state is not good. However, during a bonding process of the circuit board 2 and the touch sensor 1, cracks are likely to occur around a bonding area 3 (dashed frame) of the touch sensor, thereby affecting a normal function of the touch sensor. For example, the touch sensor 1 has an edge trace 14 around the bonding area 3 connecting to a touch electrode in a display area 4 and a normal pin 13 of the touch sensor, and cracks around the bonding area 3 is likely to cause the edge trace 14 to break.

Figure 2:
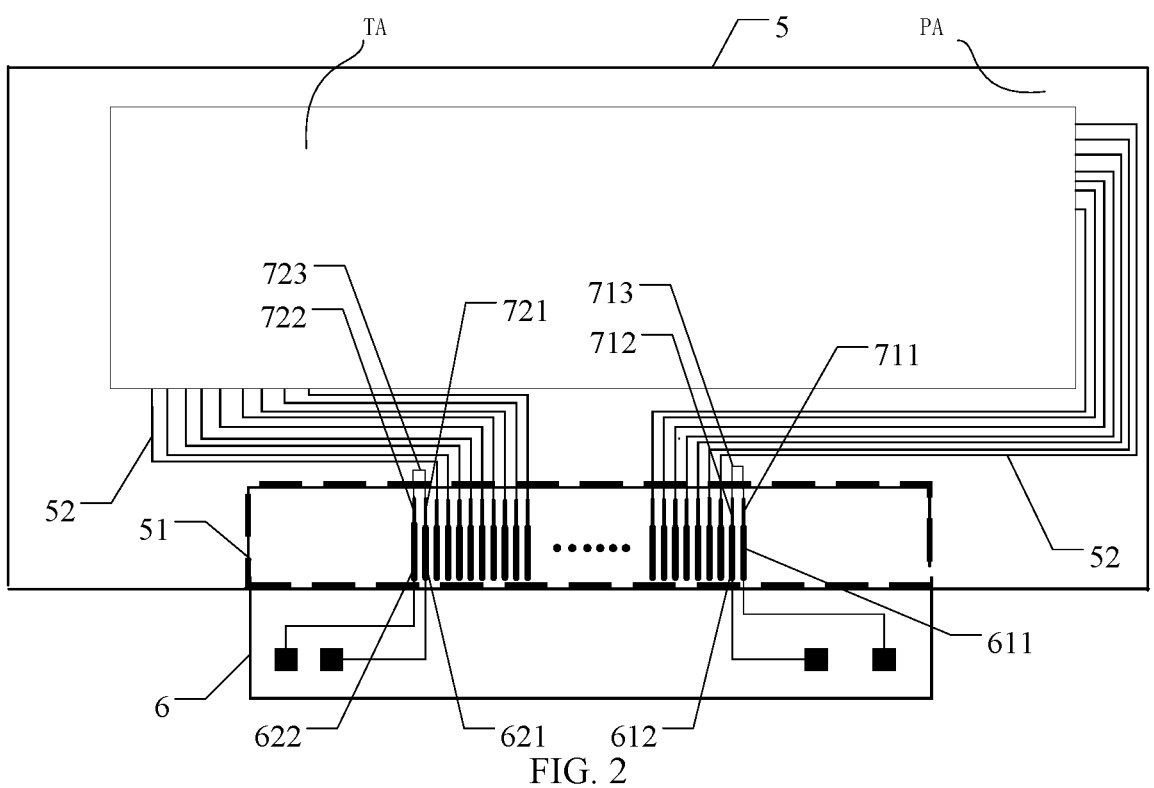
FIG. 2 is a schematic structural diagram of an exemplary embodiment of a touch sensor of the present disclosure.

Based on this, the present exemplary embodiment provides a touch sensor, including a touch area and a peripheral area surrounding the touch area, the peripheral area in at least one side of the touch area including a bonding area, wherein, the bonding area is provided with at least one test pin group for detecting cracks of a touch panel; each of the test pin groups in the at least one test pin group includes two test pins, the two test pins are short-circuited by a short-circuiting wire, and the short-circuiting wire extends beyond the bonding area. As shown in FIG. 2, it shows a schematic structural diagram of an exemplary embodiment of a touch sensor of the present disclosure. A touch sensor 5 is provided with a touch area (TA) and a bonding area 51 (dashed frame) for bonding a circuit board 6. The bonding area 51 may be located in a peripheral area (PA) surrounding the TA. A first test pin group for detecting a bonding state of the touch sensor 5 and the circuit board 6 is provided in the bonding area 51, the first test pin group includes two first test pins 711, 712, the two first test pins 711, 712 are short-circuited through a first short-circuiting wire 713, and the short-circuiting wire 713 extends beyond the bonding area 51. Correspondingly, the circuit board 6 is provided with two test pins 611, 612. When the circuit board 6 is bound to the touch sensor 5, the test pin 611 is directly opposite to the first test pin 711, and the test pin 612 is directly opposite to the first test pin 712.

The present exemplary embodiment provides a touch sensor. Short-circuiting wires of the touch sensor that short-circuits two test pins extends beyond a bonding area. When a crack occurs at a position of a first short-circuiting wire around the bonding area, the first short-circuiting wire cracks, so that a resistance between the two test pins on a circuit board will be infinite. On one hand, the touch sensor provided by the present disclosure may determine whether a crack occurs in the touch sensor by testing an electrical signal between the two test pins on the circuit board; on the other hand, the touch sensor provided by the present disclosure may judge a bonding state of the touch sensor and the circuit board by testing the resistance between two test pins on the circuit board.

In this exemplary embodiment, as shown in FIG. 2, a first test pin group may be provided on a first side of the bonding area, a second side opposite to the first side in the bonding area 51 may also be provided with a second test pin group for detecting the bonding state of the touch sensor 5 and the circuit board 6, the second test pin group may include two second test pins 721, 722, the two second test pins 721, 722 are short-circuited through a second short-circuiting wire 723, and the second short-circuiting wire 723 extends beyond the bonding area 51. Correspondingly, the circuit board 6 is provided with two test pins 621, 622. When the circuit board 6 is bound to the touch sensor 5, the test pin 621 is directly opposite to the second test pin 721, and the test pin 622 is directly opposite to the second test pin. By detecting the electrical signal between the two test pins 621, 622, it may be determined whether a crack has occurred in a position of the second short-circuiting wire.

A side where an edge trace 52 extends beyond the bonding area is a high-risk area where the edge trace of the touch sensor cracks. In this exemplary embodiment, the first short-circuiting wire 713 and the second short-circuiting wire 723 may extend beyond the bonding area along an extending direction of the edge trace 52 of the bonding area 51. As shown in FIG. 2, the first short-circuiting wire 713 and the second short-circuiting wire 723 extend beyond the bonding area along an upward direction. This configuration may focus on detecting a cracked state on a side of the bonding area where the edge trace 52 of the touch sensor extends beyond.

Referring to FIG. 2, the first short-circuiting wire 713 and the second short-circuiting wire 72 each has a route starting from one test pin of the test pin group, extending outside the bonding area and retaining to another test pin of the test pin group. In further detail, according to this embodiment, the first short-circuiting wire 713 and the second short-circuiting wire 72 each has two traces substantially parallel to teach other, and the two traces are connected to the two test pins, respectively.

It should be understood that in other exemplary embodiments, other numbers of test pin groups may be provided in the bonding area, and a plurality of groups of test pin groups may detect the cracked state at different positions of the touch sensor, and may determine a location of a crack of the touch sensor. The first short-circuiting wire 713 and the second short-circuiting wire 723 may also extend beyond the bonding area in other directions and in other ways, which all fall within the protection scope of the present disclosure.

Figure 3:
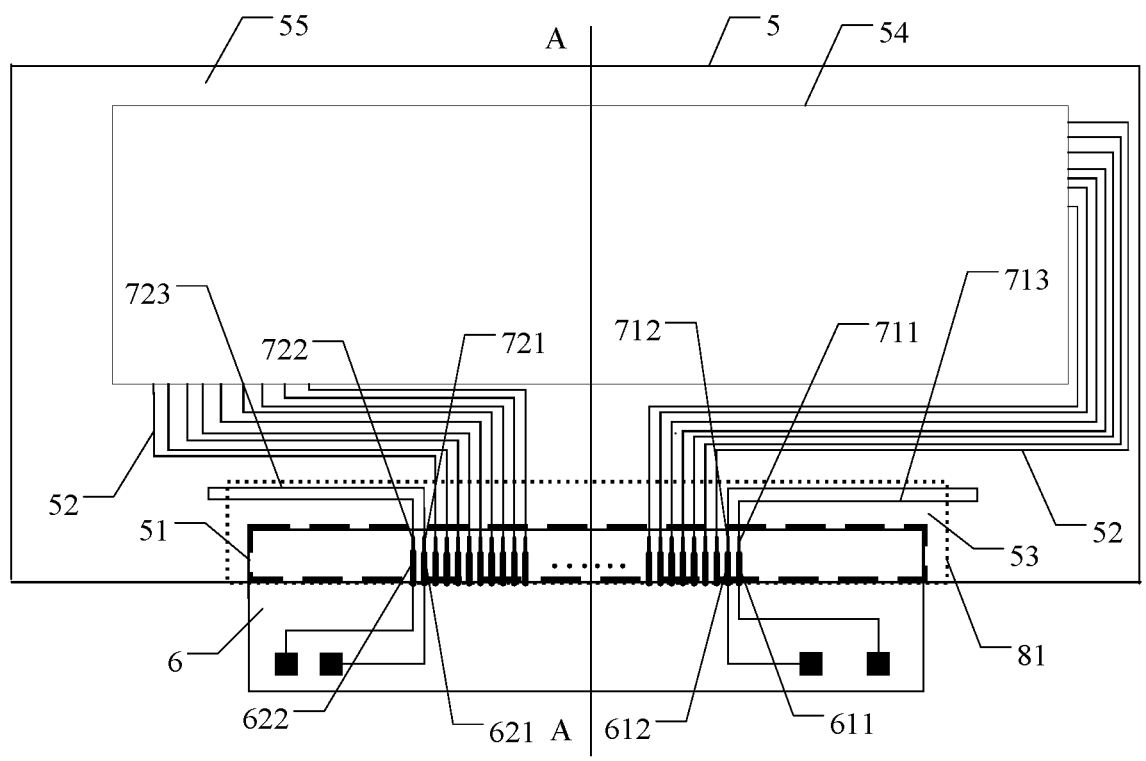
FIG. 3 is a schematic structural diagram of another exemplary embodiment of a touch sensor of the present disclosure.
Figure 4:
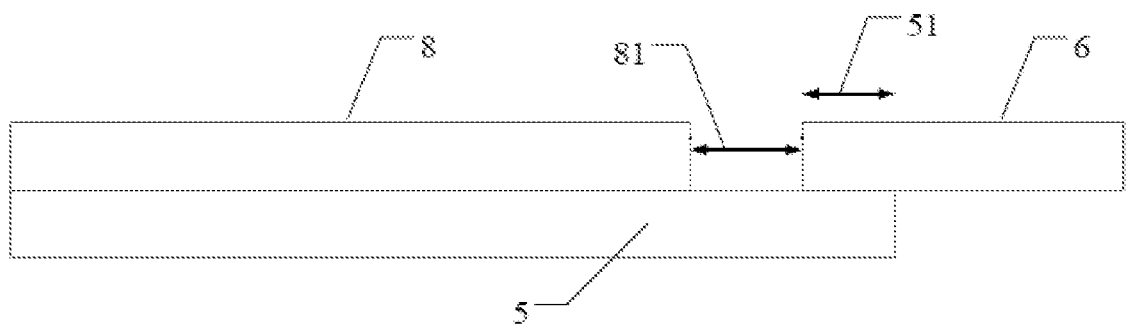
FIG. 4 is a cross-sectional view along A-A in FIG. 3.

When the touch sensor is assembled into a display module, it needs to be attached to a substrate. According to different integration methods of the touch sensor, the substrate may be a polarizer, a protective glass, or the like. In this exemplary embodiment, as shown in FIGS. 3 and 4, FIG. 3 is a schematic structural diagram of another exemplary embodiment of the touch sensor of the present disclosure, and FIG. 4 is a cross-sectional view along A-A in FIG. 3. The touch sensor 5 is attached to a substrate 8, the substrate 8 is provided with a slotted area 81, and the bonding area 51 is formed in the slotted area 81. The touch sensor 5 is located in the slotted area 81, and a position outside the bonding area is free of any film or layer. In this embodiment, a special-shaped area may be formed by substituting the bonding area 51 from the slotted area 81, and this special-shaped area is referred to as a special-shaped slotted area 53. The special-shaped slotted area 53 is a high-risk area where cracks occur in the touch sensor. In the present exemplary embodiment, the first short-circuiting wire 713 and the second short-circuiting wire 723 may extend through the special-shaped slotted area to the coupling area the touch sensor 5 and the substrate 8. This configuration may detect whether there is a crack around the bonding area of the touch sensor, and also whether there is a crack in the special-shaped slotted area.

In this exemplary embodiment, the first short-circuiting wire 713 may extend to the special-shaped slotted area along an extending direction of the edge trace in the slotted area, and extend to the coupling area of the touch sensor and the substrate along a direction of a first side of the bonding area. The second short-circuiting wire extends to the special-shaped slotted area along the extending direction of the edge trace in the slotted area, and extends to the coupling area of the touch sensor and the substrate along a direction of a second side of the bonding area.

In this exemplary embodiment, the touch sensor 5 generally includes a display area 54 and an edge area 55 surrounding the display area, the display area 54 is provided with a touch electrode, and the edge area 55 may be provided with an edge trace and other components. The first short-circuiting wire and the second short-circuiting wire may extend along the edge area, so as not to affect the normal function of the touch sensor in the display area.

Figure 5:
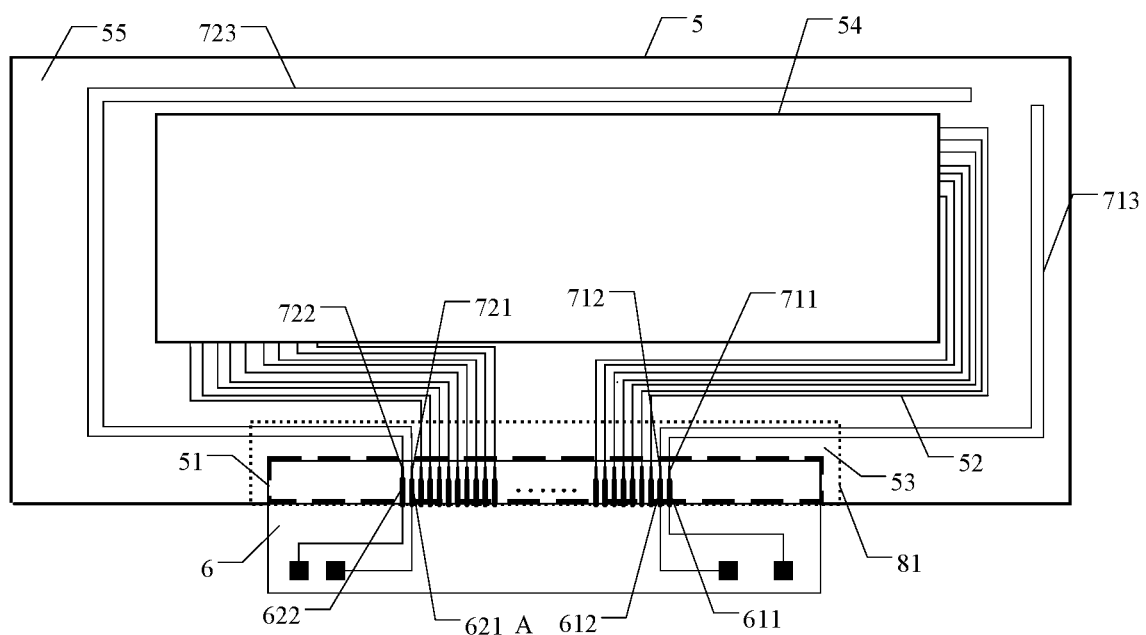
FIG. 5 is a schematic structural diagram of another exemplary embodiment of a touch sensor of the present disclosure.

In this exemplary embodiment, as shown in FIG. 5, it shows a schematic structural diagram of another exemplary embodiment of a touch sensor of the present disclosure. The first short-circuiting wire 713 and the second short-circuiting wire 723 may be extend all over the edge areas, that is, the first short-circuiting wire 713 and the second short-circuiting wire 723 will completely encircle the touch area. When a crack occurs at any position around the touch sensor and the first short-circuiting wire or the second short-circuiting wire cracks, the above detection method may be used to determine whether a crack has occurred.

This exemplary embodiment also provides a touch module, including the above-mentioned touch sensor and a circuit board provided with a touch integrated circuit, the circuit board being bound to the touch sensor. At least one test pin group is provided in the bonding area of the circuit board, and the test pin group includes two test pins. When the circuit board is bound to the touch sensor, two test pins of the touch sensor are directly opposite to two test pins of the circuit board.

The touch module provided by this exemplary embodiment has same technical features and working principles as the above-mentioned touch sensor. The above content has been described in detail, and will not be repeated here.

This exemplary embodiment also provides a touch sensor crack detection method for detecting the above-mentioned touch module, and the method includes:

Step S1: adopting, by an electrical signal collection unit, an electrical signal between two test pins on the circuit board; and Step S2: determining whether a touch sensor has a crack according to the electrical signal.

The electrical signal collection unit may be a resistance detection device. When the resistance detection device detects that a resistance between the two test pins on the circuit board is infinite, it may determine that the touch sensor has the crack.

In an embodiment of the present disclosure, the method may also be used to detect a location where the touch sensor has the crack. Specifically, the method further includes collecting an electrical signal between a plurality of test pin groups with different short-circuiting wire extension lengths through the electrical signal collection unit and determining whether the touch sensor has the crack and a location of the crack according to the electrical signal.

The present disclosure provides a touch sensor, a touch module, and a touch sensor crack detection method. The touch sensor short-circuits two test pins and extends beyond a bonding area. When a crack occurs around the bonding area of the touch sensor, a short-circuiting wire cracks, so that a resistance between the two test pins on a circuit board will be infinite. On one hand, the touch sensor provided by the present disclosure may determine whether the touch sensor has a crack by testing the resistance between two test pins on the circuit board; on the other hand, the touch sensor provided by the present disclosure may determine a bonding state of the touch sensor and the circuit board by testing the resistance between the two test pins on the circuit board.

Those skilled in the art will easily think of other embodiments of the present disclosure after considering the specification and practicing the disclosure disclosed herein. This application is intended to cover any variations, uses, or adaptive changes of the present disclosure that follow the general principles of the present disclosure and include common general knowledge or common technical means in the technical field not disclosed in the present disclosure. The description and examples are to be considered exemplary only, and the true scope and spirit of this disclosure are pointed out by the appended claims.

The features, structures, or characteristics described above may be combined in one or more embodiments in any suitable manner, and the features discussed in the embodiments are interchangeable, if possible. In the above description, many specific details are provided to give a full understanding of the embodiments of the present disclosure. However, those skilled in the art will realize that the technical solutions of the present disclosure may be practiced without one or more of the specific details, or other methods, components, materials, etc. may be adopted. In other instances, well-known structures, materials, or operations have not been shown or described in detail to avoid obscuring aspects of the present disclosure.

What is claimed is:

1. A touch panel, comprising:
   a touch area and a peripheral area surrounding the touch area;
   a bonding area provided in the peripheral area at at least one side of the touch area, the bonding area being used for bonding a circuit board, wherein:
      at least one test pin group is provided in the bonding area for detecting cracks of the touch panel; and
      each test pin group comprises two test pins, the two test pins are short-circuited by a short-circuiting wire, and the short-circuiting wire extends beyond the bonding area.

2. The touch panel according to claim 1, wherein the bonding area is located in a slotted area of a substrate to which the touch panel is attached, the slotted area comprises a special-shaped slotted area at a region of the slotted area other than the bonding area, and the short-circuiting wire is configured to pass through the special-shaped slotted area and is extended to the peripheral area outside the slotted area.

3. The touch panel according to claim 1, wherein the short-circuiting wire surrounds the touch area.

4. The touch panel according to claim 2, wherein the at least one test pin group comprises:
   a first test pin group provided on a first side of the bonding area and comprising two first test pins, the two first test pins being short-circuited through a first short-circuiting wire; and
   a second test pin group provided on a second side of the bonding area opposite to the first side, the second test pin group comprising two second test pins and the two second test pins being short-circuited through a second short-circuiting wire.

5. The touch panel according to claim 4, wherein the first short-circuiting wire is extended to the special-shaped slotted area and extends along an edge trace of the special-shaped slotted area, and the first short-circuiting wire is extended to the peripheral area of the touch panel at the first side of the bonding area.

6. The touch panel according to claim 5, wherein the second short-circuiting wire is extended to the special-shaped slotted area and extends along the edge trace of the special-shaped slotted area, and the second short-circuiting wire is extended to the peripheral area of the touch panel at the second side of the bonding area opposite to the first side.

7. The touch panel according to claim 4, wherein the first short-circuiting wire and the second short-circuiting wire are extended over the peripheral area.

8. The touch panel according to claim 7, wherein the first short-circuiting wire and the second short-circuiting wire meet at a corner of the peripheral area but do not contact with one another.

9. The touch panel according to claim 4, wherein a length of the first short-circuiting wire extending in the peripheral area is different from a length of the second short-circuiting wire extending in the peripheral area.

10. A touch module, comprising:
    a touch panel, comprising:
       a touch area and a peripheral area surrounding the touch area;
       a bonding area provided in the peripheral area at at least one side of the touch area; and
    a circuit board provided with a touch integrated circuit, the circuit board being bound to the bonding area of the touch panel;
    wherein at least one test pin group is provided in the bonding area of the circuit board for detecting at least one crack of the touch panel, and the at least one test pin group comprises two test pins short-circuited by a short-circuiting wire, and the short-circuiting wire extends beyond the bonding area; and
    wherein, when the circuit board is bound to the touch panel, the two test pins of the touch panel are directly opposite to two test pins of the circuit board, respectively.

11. A method for detecting cracks in a touch panel, comprising:
    providing a touch module comprising a touch panel, the touch panel comprising: a touch area and a peripheral area surrounding the touch area; a bonding area provided in the peripheral area at at least one side of the touch area, the touch module further comprising a circuit board provided with a touch integrated circuit, the circuit board being bound to the bonding area of the touch panel, wherein:
       at least one test pin group is provided in the bonding area of the circuit board, the at least one test pin group comprises two test pins short-circuited by a short-circuiting wire, and the short-circuiting wire extends beyond the bonding area; and
       when the circuit board is bound to the touch panel, the two test pins of the touch panel are directly opposite to two test pins of the circuit board, respectively
    collecting, by an electrical signal collection unit, an electrical signal between the two test pins of the circuit board;
    determining that a touch panel has a crack according to the electrical signal.

12. The method according to claim 11, further comprising:
    collecting electrical signals between a plurality of test pin groups with different short-circuiting wire extension lengths through the electrical signal collection unit; and
    determining that the touch panel has the crack and a location of the crack according to the electrical signal.

13. The touch panel according to claim 1, wherein the touch panel further comprises:
    a plurality of touch traces each of which comprises a first end connected to a touch electrode and a second end connected to a touch pin among a plurality of touch pins,
    wherein the plurality of touch pins are provided in the bonding area, and the test pins are provided outside a region where the plurality of touch pins are formed.

14. The touch panel according to claim 13, wherein the short-circuiting wires are provided at a side of the touch trace away from the touch area.

15. The touch panel according to claim 1, wherein the short-circuiting wire has a route starting from one test pin of the test pin group, extends outside the bonding area, and retains to another test pin of the test pin group.

16. The touch panel according to claim 15, wherein the short-circuiting wire comprising two traces substantially parallel to teach other, and the two traces are connected to the two test pins, respectively.

\* \* \* \* \*